United States Patent [19]

Lipp et al.

[11] Patent Number: 5,449,541
[45] Date of Patent: Sep. 12, 1995

[54] ELECTRICALLY HEATABLE HONEYCOMB STRUCTURES

[75] Inventors: G. Daniel Lipp; Srinivas H. Swaroop, both of Painted Post; Donald M. Trotter, Newfield; Raja R. Wusirika, Painted Post, all of N.Y.

[73] Assignee: Corning Incorporated, Corning, N.Y.

[21] Appl. No.: 119,833

[22] Filed: Sep. 13, 1993

Related U.S. Application Data

[63] Continuation of Ser. No. 967,186, Oct. 27, 1992, abandoned.

[51] Int. Cl.$^6$ ................................................ B32B 3/12
[52] U.S. Cl. ...................................... 428/116; 219/552; 392/485
[58] Field of Search ................ 428/116, 118; 219/552; 392/485

[56] References Cited

U.S. PATENT DOCUMENTS

| | | | |
|---|---|---|---|
| 3,112,184 | 11/1963 | Hollenbach | 428/116 X |
| 3,208,131 | 9/1965 | Ruff et al. | 502/527 X |
| 3,444,925 | 5/1969 | Johnson | 428/116 X |
| 3,580,981 | 5/1971 | Lamp et al. | 428/116 X |
| 3,790,654 | 2/1974 | Bagley | 428/116 X |
| 3,889,464 | 6/1975 | Gardner | 60/286 |
| 3,963,504 | 6/1976 | Lundsager | 502/527 X |
| 3,992,330 | 11/1976 | Noakes et al. | 502/527 X |
| 3,995,143 | 11/1976 | Hervert | 428/116 X |
| 4,086,427 | 4/1978 | Nasuta, Jr. et al. | 428/118 X |
| 4,283,207 | 8/1981 | Martyniuk | 55/282 |
| 4,329,162 | 5/1982 | Pitcher, Jr. | 428/117 X |
| 4,505,726 | 3/1985 | Takeuchi et al. | 55/282 |
| 4,535,589 | 8/1985 | Yoshida et al. | 55/282 X |
| 4,623,951 | 11/1986 | DuPont et al. | 428/116 X |
| 4,662,911 | 5/1987 | Hirayama et al. | 55/282 |
| 4,758,272 | 7/1988 | Pierotti et al. | 55/523 X |
| 4,813,231 | 3/1989 | Bykowski | 55/523 X |
| 4,882,089 | 11/1989 | Iwaskow et al. | 428/242 |
| 4,990,181 | 2/1991 | Pierotti et al. | 75/246 |
| 5,063,029 | 11/1991 | Mizuno et al. | 428/116 X |
| 5,202,547 | 4/1993 | Abe et al. | 428/116 X |
| 5,202,548 | 4/1993 | Kondo et al. | 428/116 X |
| 5,393,586 | 2/1995 | Lipp | 428/116 |

*Primary Examiner*—Henry F. Epstein
*Attorney, Agent, or Firm*—Kees van der Sterre

[57] ABSTRACT

Electrically conductive honeycomb structures are provided for use as catalytic converters, pre-heaters for catalytic converters, or particulate filters. The honeycomb structures are composed of subunits which are arranged to produce a serpentine conductive path through the honeycomb. The serpentine path gives the honeycomb an increased electrical resistance so that elevated temperatures can be achieved with less current. The subunits allow the serpentine current path to be produced without any slitting or cutting of the honeycomb.

14 Claims, 1 Drawing Sheet

ELECTRICALLY HEATABLE HONEYCOMB STRUCTURES

This is a continuation of application Ser. No. 07/967,186 filed Oct. 27, 1992 and now abandoned.

BACKGROUND OF THE INVENTION

FIELD OF THE INVENTION

This invention relates to honeycomb structures and, in particular, to honeycomb structures which can be heated electrically.

DESCRIPTION OF THE PRIOR ART

Electrically heatable honeycomb structures of various configurations have been proposed in the art to serve as catalytic converters, preheaters for catalytic converters, and particulate filters.

For example, Japanese Patent Publication No. 57,110,311 discloses a filter for diesel exhaust gases formed by sealing off alternate cells on the two ends of a porous honeycomb. (See Pitcher, Jr., U.S. Pat. No. 4,329,162, for the basic structure of such a particulate filter.) The filter of the Japanese publication is composed of silicon carbide so that it is electrically conductive. Accumulated carbon particles are burned out of the filter by passing electrical current through the honeycomb in the direction of the longitudinal axis of the cells. Japanese Patent Publication No. 58-143,817 discloses a similar silicon carbide filter in which the current is passed through the honeycomb in a direction transverse to the cells' longitudinal axis rather than parallel to that axis.

Japanese Patent Publication No. 58-143,815 discloses another approach for using an electrical current to regenerate a particulate filter. In this case, the filter is made of a non-conductive, porous ceramic and has an accordion rather than a honeycomb configuration. Accumulated carbon particles are burned off of this filter by passing current through the carbon particles rather than through the filter material.

With regard to catalytic converters, Mizuno et. al., U.S. Pat. No. 5,063,029, discloses a metal honeycomb which is electrically heated and serves as a preheater for a conventional catalytic converter. Slits are cut into the honeycomb and filled with an insulating adhesive to increase the honeycomb's resistance by causing the current to follow an elongated serpentine path. Along these same lines, PCT Patent Publication No. WO89/10471 discloses a catalyst support comprising an electrically conductive honeycomb in which a serpentine current path is used to increase the honeycomb's electrical resistance.

SUMMARY OF THE INVENTION

As the foregoing discussion of the prior art demonstrates, substantial efforts have been made to heat conductive honeycombs electrically and, in particular, proposals have been made to use serpentine electrically conductive paths to increase the electrical resistance of a conductive honeycomb. These efforts and proposals, however, have not achieved successful commercial implementation.

One of the significant problems impeding commercial implementation has been in the formation of the serpentine current path. Although saw cuts and adhesive fillers of the type described in the Mizuno et. al. patent can be used to create the serpentine path, such slitting tends to weaken the honeycomb, leads to high levels of rejected parts due to cracks or other defects in the honeycomb produced during the cutting process, and involves substantial post fabrication steps which increase the cost of the finished product. Similarly, the complex folding procedures described in PCT Patent Publication No. 89/10471 are in general not well-suited for commercial production of large quantities of electrically heatable honeycomb structures.

In view of this state of the art, it is an object of this invention to provide practical methods for constructing serpentine conduction paths in electrically heatable honeycomb structures and to provide electrically heatable honeycomb structures having such serpentine conduction paths. In particular, it is an object of this invention to provide such a path without any folding or slitting of the finished honeycomb.

To achieve these and other objects, the invention in accordance with certain of its aspects provides a method for constructing an electrically conductive honeycomb comprising:

(a) providing a plurality of electrically conductive honeycomb subunits;

(b) providing first electrical conductor means;

(c) attaching the first electrical conductor means to a first one of the subunits;

(d) providing second electrical conductor means;

(e) attaching the second electrical conductor means to a second one of the subunits; and (f) forming a serpentine, electrically-conductive path between the first and second subunits by attaching the plurality of subunits to one another, each subunit, including the first and second subunits, being attached to and in electrical communication with at least one other subunit.

In certain embodiments of the invention, each of the subunits is in the form of a rectangular parallelepiped. In other embodiments, the subunits have a stepped cross-ssection. Preferably, the subunits are attached to one another by an electrically conductive adhesive.

If desired, electrically insulating members can be placed between portions of the subunits to provide electrical isolation and overall structural strength for the honeycomb structure. When the honeycomb structure is used as a particulate filter, such insulating members also ensure that all gases passing through the honeycomb structure are filtered, i.e., the insulating members prevent gases from passing through the spaces between the subunits which produce the serpentine electrical path.

In addition to its method aspects, the invention also includes honeycomb structures comprising assembled subunits of the foregoing types. Such structures can be used as supports for catalytic converters, preheaters for catalytic converters, particulate filters (e.g. diesel particulate filters), and in other applications for honeycomb structures now known or subsequently developed.

As used herein, the terms "honeycomb" or "honeycomb structure" refer to a body having a number of passages or cells therein partitioned by walls. The passages can have any cross-sectional shape, e.g., square, rectangular, triangular, hexagonal, etc. There is no limitation on dimensions, e.g., diameter, length, number of cells or thickness of cell walls in the honeycomb as these can vary according to the application.

The accompanying drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

DESCRIPTION OF THE PREFERRED EMBODIMENTS

Figure 1:
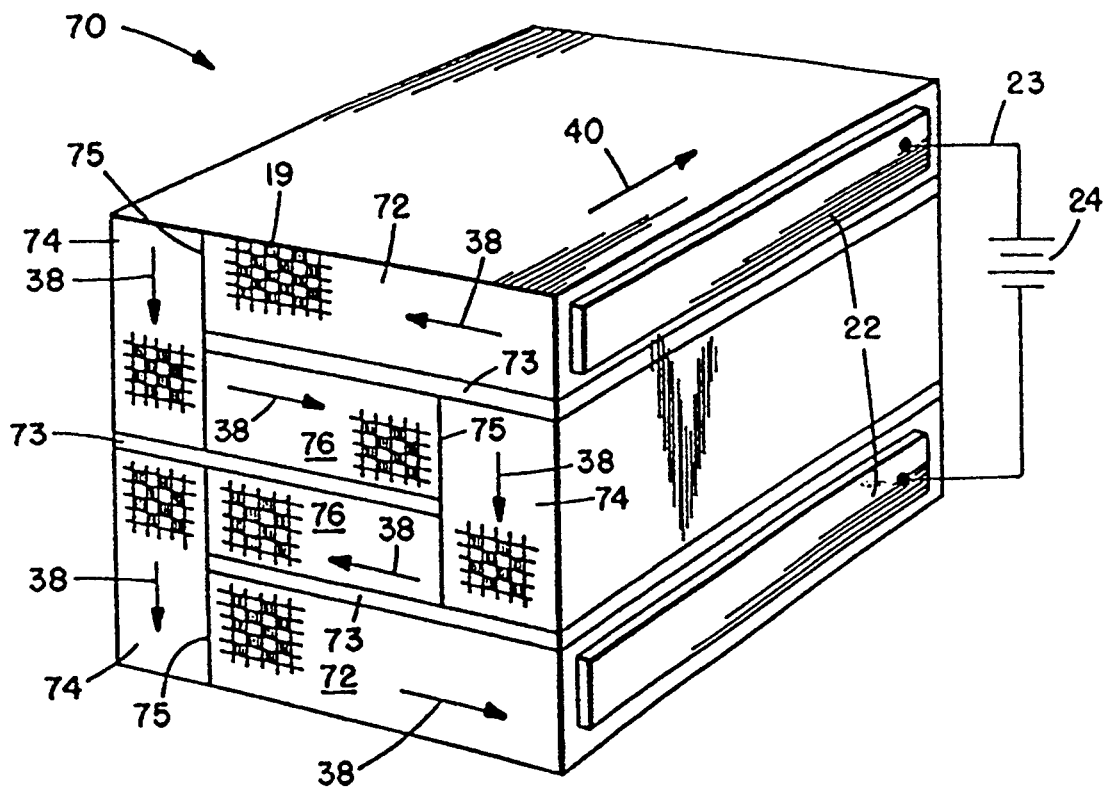
FIG. 1 is a partially schematic, perspective view of a honeycomb structure constructed in accordance with the invention using subunits which are rectangular parallelepipeds.

FIG. 1 shows a honeycomb structure 70 composed of subunits 72, 74, and 76, each of which is in the form of a rectangular parallelepiped. Each of the subunits is an electrically conductive honeycomb.

Preferably, the desired electrical conductivity is achieved by forming the subunits out of an electrically conductive material. Suitable materials include alloys of the type disclosed in Pierotti et. al., U.S. Pat No. 4,758,272, U.S. Pat. No. 4,990,181, and in co-pending U.S. patent application Ser. No. 07/767,889 filed Sep. 30, 1991, the relevant portions of each of which are incorporated herein by reference.

The honeycomb may also be formed of stainless steel or other high temperature resistant metals or alloys, e.g., alloys of and between aluminum, iron, nickel, titanium, niobium, chromium, cobalt, copper, silicon, molybdenum, tantalum, tungsten, yttrium, zirconium, and rare earth metals. Silicon carbide or a cermet may also be used. In general, any material which is electrically conductive and which exhibits high temperature resistance (e.g., can resist oxidation when heated) is suitable for the practice of the invention.

In addition to using honeycombs formed from conductive materials, the subunits can also be made of a non-conductive material and then coated with a layer of a conductive material such as a metal alloy which has a high temperature resistance. In general, however, the coating approach is not preferred because of the extra costs and labor involved in the coating process.

For heaters, the electrically conductive metal alloy or metallic composition is selected to provide suitable electrical resistance heating while electrical current is flowed through it.

The subunits can be readily prepared using conventional fabricating techniques well-known in the art. For a sintered honeycomb body (more commonly having porous walls), the conventional techniques of plastically forming, drying, and firing can include those based on extrusion as in U.S. Pat. No. 3,790,654 and those based on assembling green or unfired sheets or strips as in U.S. Pat. Nos. 3,112,184, 3,444,925, and 3,963,504. The honeycomb body can also be formed of crimped foil, such as in U.S. Pat. Nos. 3,208,131 and 3,992,330, and in British Patent Application Publication GB 2206130A. Fabrication based on the extrusion technique is preferred.

As shown in FIG. 1, honeycomb 70 is designed to serve as a particulate filter and thus the ends of the cells are plugged in the manner described in Pitcher, Jr., U.S. Pat. No. 4,329,162, to form checkerboard pattern 19. A complimentary checkerboard pattern is formed at the far end of the honeycomb so that gases which enter through unplugged ends in the front face of the filter must pass through the cell walls in order to exit through unplugged ends at the rear face of the filter. In FIG. 1, the overall gas flow through the filter is shown schematically by reference numeral 40.

In cases where the conductive honeycomb is used as a catalytic converter or a preheater for such a converter, plugging of alternate cells is not performed. Such a honeycomb for a converter or, if desired, a preheater can be provided, by conventional, otherwise known, or suitable means, with high surface area material(s) as a single or multiple layer, coating or film on, and/or deposit in the pores of, the walls of the honeycomb. The high surface area material(s) can support catalyst material(s) provided thereon by conventional, otherwise known, or suitable means.

Preferably, the subunits are extruded to have their finished cross-sectional shape, although, if desired, a larger honeycomb structure can be extruded and cut or ground into subunits after firing. The overall honeycomb 70 is formed by assembling the subunits together in a pattern of the type shown in FIG. 1. Preferably, this is performed using a conductive adhesive illustrated schematically by the reference number 75 in FIG. 1. An example of a suitable adhesive is Pyro-Duct 597, made by Aremco Products, Inc. of Ossining, N.Y. In the case of particulate filters, these same materials can be used to end plug the cells to form checkerboard pattern 19. Alternatively, the subunits can be soldered or brazed together at their mating surfaces. Also, the separate pieces in the green state (dried, but not fired) can be attached together by cementing them with a water slurry made of the same composition as the extrusion. When fired, the finished ware will be a monolithic structure.

To provide added structural strength for the honeycomb, the gaps between subunits are preferably filled with members 73 which are electrically insulating. Suitable materials which can be used for this purpose include fiber mineral mats and non-conductive ceramics. Members 73 are of particular importance when the honeycomb is used as a particulate filter since they prevent gases from passing through the filter without crossing a cell wall, as would occur if the gaps were not filled. Preferably, the full length of the gaps is filled, although, if desired, insulating members which fill only part of the gap, e.g., the front and back portions of the gap, can be used.

Current is applied to honeycomb 70 by means of metal electrodes 22 which are applied to the surface of the honeycomb by, for example, soldering. Alternatively, the electrodes can be bonded to the honeycomb using a conductive frit or a conductive adhesive of the type discussed above. Conductors 23 are attached to electrodes 22 and serve to carry electricity to the honeycomb from, for example, a storage battery 24. If desired, conductors 23 can be attached directly to the honeycomb without the use of intermediate electrodes. As used in the appended claims, the term "electrical conductor means" is intended to include all types of conductor systems capable of providing electricity to the honeycomb.

It should be noted that although direct current is normally used to heat the honeycomb, especially in automotive applications, alternating current can be used if desired. Also, to avoid overheating of the honeycomb, it is desirable to monitor the honeycomb's temperature as the heating takes place using, for example, one or more thermocouples and to cut back on the amount of current supplied to the honeycomb once a desired temperature level has been reached. This is particularly advantageous in the case of diesel particulate filters since the oxidation of accumulated carbon particles is exothermic and thus is generally self-sustaining once ignition .has been achieved.

Electrical heating of the honeycomb can be performed continuously or intermittently depending upon the application. In the case of the regeneration of diesel particulate filters, the heating can be performed while the honeycomb is carrying out its filtering action, or while it is in a bypass mode and another identical filter, in parallel, is actively filtering the exhaust gas, thereby permitting continuous operation of the diesel engine whose exhaust fumes are to be purged of carbon particles.

Because of the arrangement of the subunits 72, 74, and 76, current flows through honeycomb 70 along the serpentine path shown by reference numeral 38 in FIG. 1. Specifically, each subunit is attached to and in electrical communication with at least one other subunit. As a result, in passing between electrodes 22, current passes through all of the subunits and follows the serpentine path defined by the geometric arrangement of the subunits. Although the serpentine path as shown in FIG. 1 includes three reversals of the direction of the current, it is to be understood that in practice more or less reversals of the current path can be used to provide the desired electrical resistance for the overall honeycomb.

Figure 2:
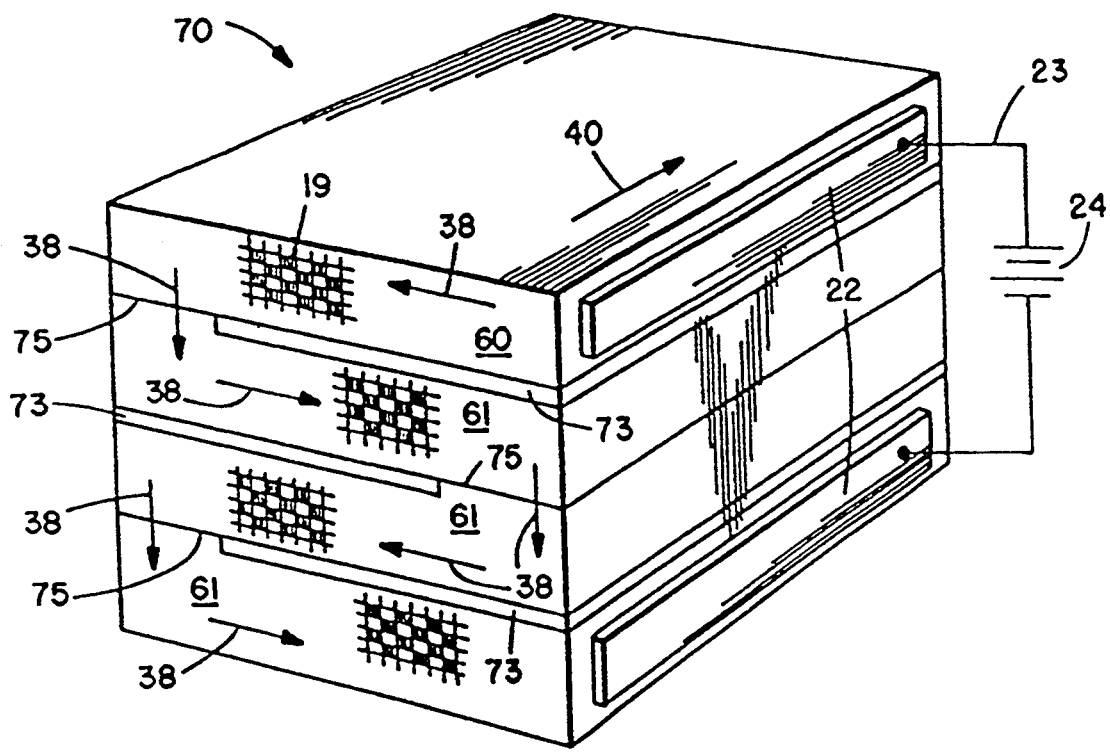
FIG. 2 is a partially schematic, perspective view of a honeycomb structure constructed in accordance with the invention using subunits having a stepped configuration.

FIG. 2 shows an alternate set of subunits 60, 61 for forming the conductive honeycomb structure of the invention. As shown in this figure, subunit 60 is a rectangular parallelepiped like subunits 72, 74, and 76, while subunits 61 include thicker and thinner portions so that the subunit has an overall stepped or L-shaped cross-section. This stepped cross-section allows the overall structure of the honeycomb of FIG. 2 to be constructed from fewer subunits than that of FIG. 1. Otherwise, the construction, assembly, and energization of the honeycombs are the same, e.g., the subunits are formed using conventional fabrication techniques, assembled using, for example, conductive adhesive 75, the gaps between subunits are preferably filled with insulating members 73, and the honeycomb is electrically heated using current carrying electrodes.

It should be noted that the stepped configuration shown in FIG. 2 can also be achieved by using rectangular parallelepiped subunits and forming the desired steps by applying a thick layer of conductive adhesive along an end of the top surface of the subunit. The desired steps also can be formed as a variation of the FIG. 1 embodiment by attaching thin, vertical subunits to the ends of rectangular parallelepiped subunits.

EXAMPLE

An electrically heatable honeycomb structure is prepared in accordance with the invention as follows.

Honeycomb subunits having 100 square cells per square inch and 0.017 inch thick walls are prepared by extruding and sintering an iron/aluminum alloy. The composition of the alloy is 23 wt% aluminum and 77 wt% iron, which is about 50/50 on a mol% basis. With reference to FIG. 1, the dimensions of subunits 72 are approximately 1 inch high, 3 inches wide, and 4 inches deep; the dimensions of subunits 76 are approximately 1 inch high, 2 inches wide, and 4 inches deep; and the dimensions of subunits 74 are approximately 2.125 inches high, 1 inch wide, and 4 inches deep.

The subunits are assembled into the configuration shown in FIG. 1 using the Pyro-Duct 597 electrically conductive adhesive described above. The finished honeycomb structure has overall dimensions of approximately 4.375 inches high, 4 inches wide and 4 inches deep. The electrically nonconductive gaps have a thickness of approximately ⅛ inch and are filled with a fiber mineral mat. Brass electrodes are attached to the honeycomb using silver solder.

The honeycomb structure is heated by applying electrical power at a voltage of 1.4 volts AC and a current of 300 amperes. Substantial heating of the honeycomb is achieved in this way.

Honeycomb structures of the type shown in FIG. 2 are constructed and operated in a similar manner with the substitution of L-shaped subunits for the parallelepiped subunits of FIG. 1.

Although specific embodiments of the invention have been described and illustrated, it is to be understood that modifications can be made without departing from the invention's spirit and scope. The following claims are intended to cover the specific embodiments set forth herein as well as such modifications, variations, and equivalents.

What is claimed is:

1. An electrically conductive honeycomb structure comprising:
    (a) a plurality of electrically conductive honeycomb subunits;
    (b) first electrical conductor means attached to a first one of the subunits; and
    (c) second electrical conductor means attached to a second one of the subunits;
    wherein the subunits are attached to one another to form a serpentine electrically conductive path between the first and second subunits, each subunit, including the first and second subunits, being attached to and in electrical communication with at least one other subunit.

2. The electrically conductive honeycomb structure of claim 1 wherein the subunits are attached to one another by an electrically conductive adhesive.

3. The honeycomb structure of claim 1 further comprising an electrically insulating member between a portion of the external surface of one subunit and a portion of the external surface of another subunit.

4. The honeycomb structure of claim 1 wherein each of the subunits is a rectangular parallelepiped.

5. The honeycomb structure of claim 1 wherein at least one of the subunits has a stepped cross-section.

6. The honeycomb structure of claim 5 wherein the cross-section is in a direction transverse to the longitudinal axis of the cells of the honeycomb structure.

7. The honeycomb structure of claim 1 wherein the serpentine conductive path is transverse to the longitudinal axis of the cells of the honeycomb structure.

8. An electrically conductive honeycomb structure comprising:
    (a) a first electrically conductive honeycomb subunit having an end surface;
    (b) a second electrically conductive honeycomb subunit having an end surface; and (c) a third electrically conductive honeycomb subunit attached to and in electrical communication with (i) the end surface of the first subunit and (ii) the end surface of the second subunit, the third subunit providing a conductive path between the first and second subunits, the first and second subunits being otherwise electrically isolated from one another.

9. The electrically conductive honeycomb structure of claim 8 wherein the third subunit is attached to the end surfaces of the first and second subunits by an electrically conductive adhesive.

10. The honeycomb structure of claim 8 further comprising an electrically insulating member between a portion of the external surface of the first subunit and a portion of the external surface of the second subunit.

11. The honeycomb structure of claim 8 wherein the conductive path is transverse to the longitudinal axis of the cells of the honeycomb structure.

12. An electrically conductive honeycomb structure comprising:
(a) a first electrically conductive honeycomb subunit; and
(b) a second electrically conductive honeycomb subunit comprising two portions of different thicknesses, the first subunit being attached to and in electrical communication with the thicker portion of the second subunit, the first and second subunits being otherwise electrically isolated from one another.

13. The electrically conductive honeycomb structure of claim 12 wherein the first subunit is attached to the thicker portion of the second subunit by an electrically conductive adhesive.

14. The honeycomb structure of claim 12 further comprising an electrically insulating member between a portion of the external surface of the first subunit and a portion of the external surface of the second subunit.

* * * * *